UNITED STATES PATENT OFFICE.

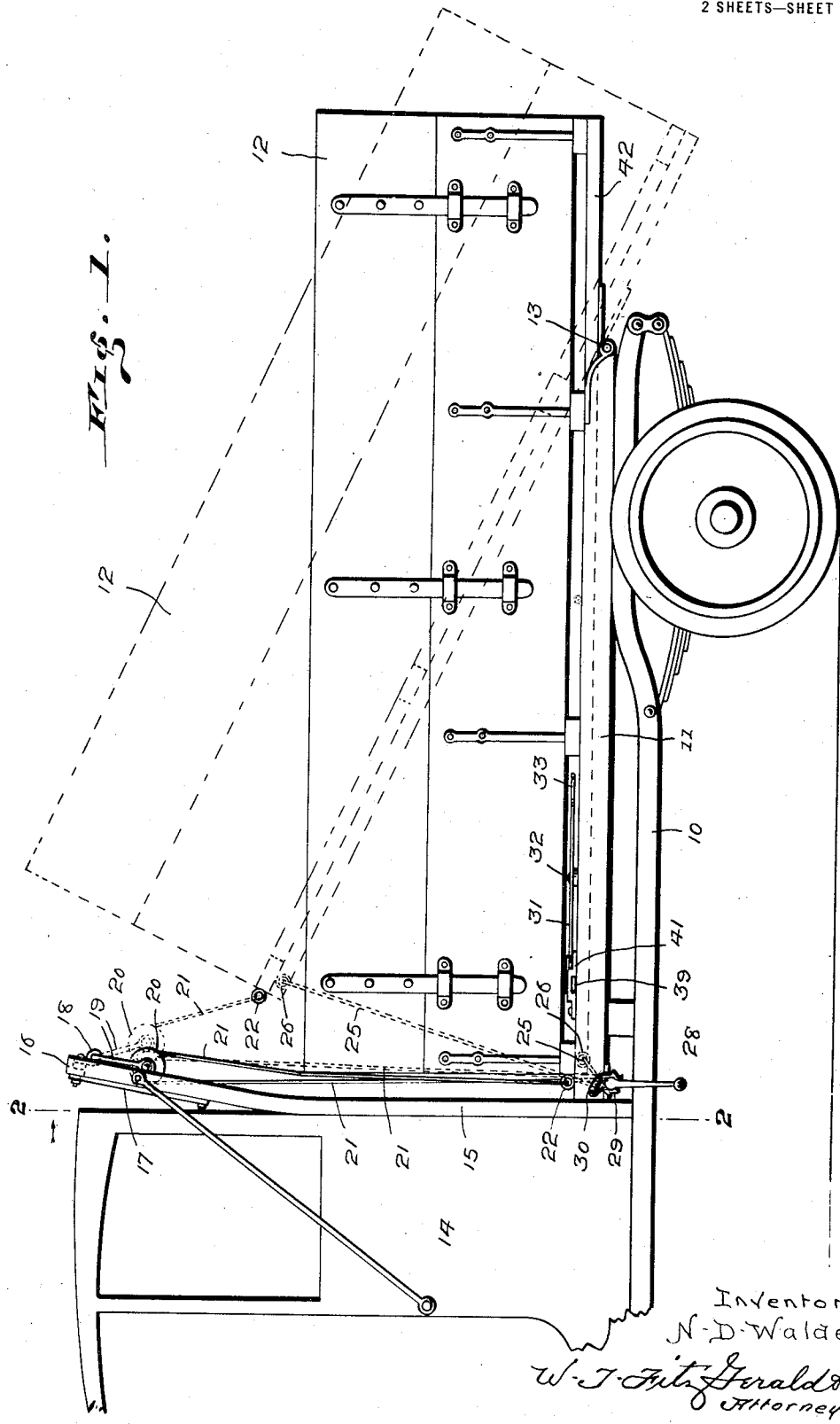

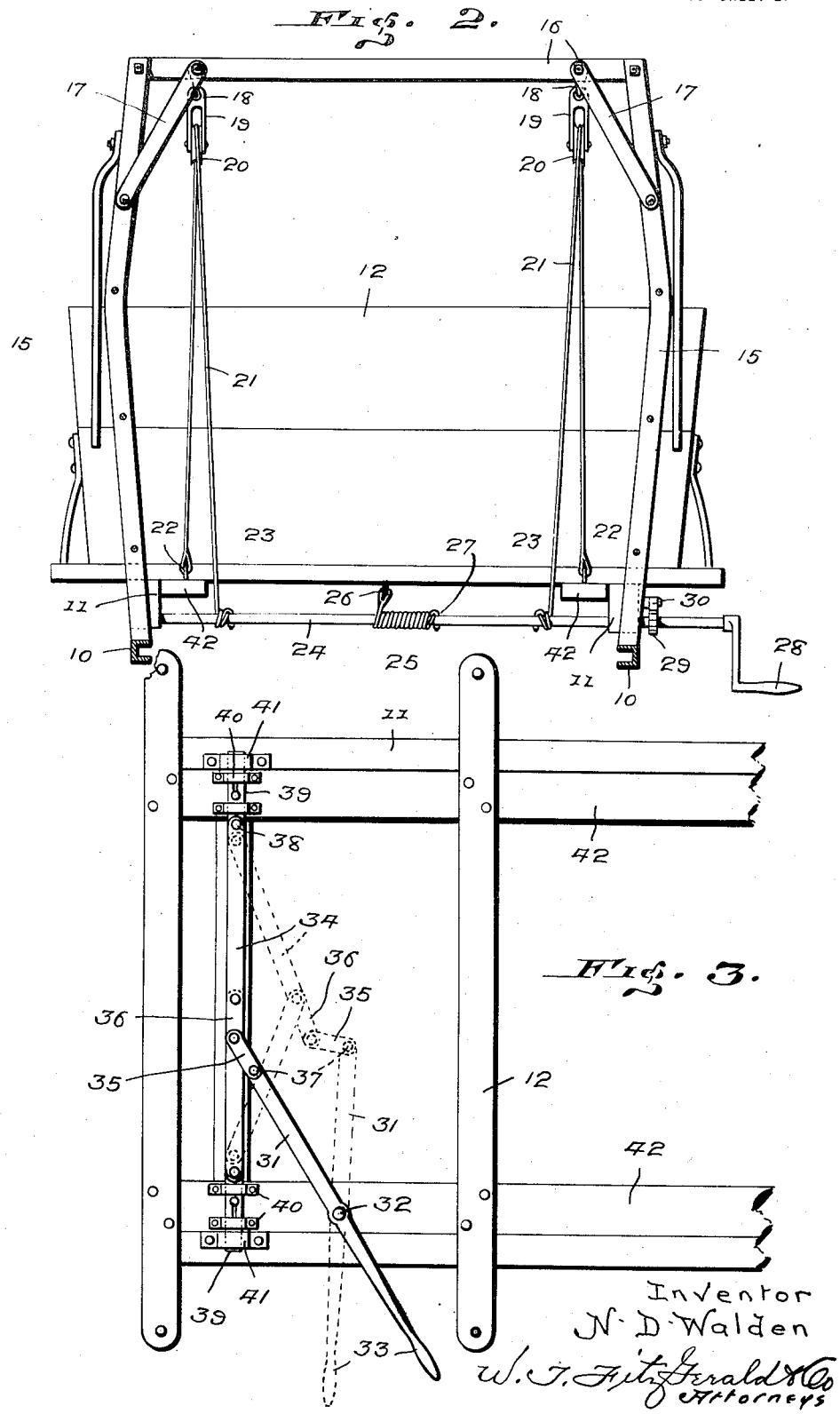

NATHAN D. WALDEN, OF DAVID CITY, NEBRASKA.

DUMPING-VEHICLE.

1,287,147. Specification of Letters Patent. Patented Dec. 10, 1918.

Application filed June 25, 1918. Serial No. 241,859.

*To all whom it may concern:*

Be it known that I, NATHAN D. WALDEN, a citizen of the United States, residing at David City, in the county of Butler and State of Nebraska, have invented certain new and useful Improvements in Dumping-Vehicles; and I do hereby declare the following to be a full, clear, and exact description of the invention, such as will enable others skilled in the art to which it appertains to make and use the same.

This invention relates to a dumping vehicle and particularly to a construction wherein the body is pivotally mounted at the rear and adapted to be raised at its forward end.

The invention has for an object to provide a novel construction and arrangement of the raising and lowering cables oppositely wound upon an operating shaft so that the raising and lowering of the body may be at all times controlled and sudden movements thereof liable to injure the mechanism prevented.

Another object of the invention is to provide means for securing and retaining the body when in its lowered or horizontal position, together with means for raising said body when the retaining means are released.

Other and further objects and advantages of the invention will be hereinafter set forth and the novel features thereof defined by the appended claims.

In the drawings,

Figure 1 is a side elevation showing the invention applied.

Fig. 2, a vertical section on line 2—2 of Fig. 1, and

Fig. 3 a detail plan of the retaining mechanism mounted upon the body.

Like numerals refer to like parts in the several figures of the drawings.

The numeral 10 designates a truck which may be of any desired character, motor driven or otherwise, and provided with the usual supporting sills 11 at each side. The wagon body 12 may be of any preferred size or design suitable for the purposes for which it is to be used and is pivotally mounted upon the sills by means of a hinge joint 13 at the rear of the vehicle.

The truck carries at its forward or cab portion 14 a supporting frame 15 for the hoisting means. The side standards of this frame are connected at the top by a cross bar 16 and suitably braced at its corners by straps 17. Depending from the cross bar 16 are pivot eyes 18 in which the frame 19 of a sheave or wheel 20 is mounted for free movement. These parts are preferably duplicated at opposite sides of the machine but a single one may be used, depending upon the weight of the body to be raised.

Over the sheaves or wheels 20 the raising cables 21 extend having one end connected at 22 to the wagon body and the opposite end connected at 23 to the winding shaft 24 mounted upon the truck frame. The wagon body is also connected with this shaft 24 by means of an oppositely wound cable 25 connected at 26 to the body and at 27 to the shaft. The cable 25 being wound in an opposite direction to the cable 21 will be unwound as the body is raised and rewound as the body is lowered, thus providing means for effectually restoring the body to lowered position and retaining the body under control at all times.

The winding shaft 24 may be operated by any desired means, for instance, a crank handle 28 thereon, and this shaft may also be provided with a ratchet 29 adapted to hold the shaft in any desired position by coöperation with the pawl 30 mounted on a fixed part.

For the purpose of locking the wagon body in lowered position, an approved form of retaining means is shown in Fig. 3 comprising the lever 31 pivotally mounted upon the sill 42 of the wagon body, as at 32, and provided with a handle 33. The inner end of this lever is connected to a toggle operating lever 34 by means of a link 35 pivoted to the end 36 of one member of the toggle and to the end of the lever 31 as at 37. The toggle members 34 are pivotally connected at their outer ends 38 with sliding bolts 39 operating through guides 40 and adapted to seat within a keeper 41 secured to the truck frame 11 at opposite sides. It will be seen that with the parts in the full line position in Fig. 3, the toggle is held straight and the bolts firmly thrown and retained in position in the keepers, while when the toggle is broken, as indicated by dotted lines, these bolts will be withdrawn to permit the raising and dumping action of the vehicle.

The operation of this invention will be apparent from the foregoing description and it will be seen that the winding of the raising or lifting cables causes an unwinding of the lowering cable, making it impossible for the wagon body to swing beyond the control of the operator so as to drop either the load or the body suddenly by which injury to the parts might occur. In the restoring action, the winding up of the lowering cable releases and unwinds the raising cable simultaneously, thus effecting a uniform action, while the pivotal mounting of the wheels or sheaves permits the same to swing outward during the movement of the body and accommodate themselves to the proper position of the cables. This arrangement also provides a structure which requires the minimum of space in its application to an ordinary truck or wagon and is adapted to be located immediately at the rear of the driver's seat or cab. The pawl and ratchet upon the winding shaft provide means to hold the load at any angle desired while releasing the winding crank and this winding shaft is so disposed as to secure a direct pull in both the raising and lowering operations. The structure of the hoisting device does not require any special form of wagon or truck, but may be readily used in converting vehicles now in use into form of commercial cars. The retaining mechanism shown provides means by which the bolts at opposite sides of the body are simultaneously operated and held in locked position. The invention presents a simple, very efficient and economically constructed mechanism for operating a dump vehicle.

What I claim is:

1. In a dump vehicle, a truck portion, a body portion pivotally mounted thereon, a winding shaft mounted upon said truck portion, oppositely wound cables extending from said shaft and connected to the base of said body portion, a hoist frame comprising opposite fixed standards mounted at the forward portion of said truck, and sheaves having their frames pivotally suspended from the said standards to swing rearwardly therefrom and over which one set of said cables extends.

2. In a dump vehicle, a truck, a body pivotally mounted upon said truck at the rear thereof, a hoist frame fixed upon the truck and having a cross bar extending across the forward end of said body, sheaves pivoted at the opposite ends of the cross bar to swing rearwardly therefrom, a winding shaft upon the truck beneath said body, lifting cables extending from the base of the front end of said body over said sheaves to said shaft, and a centrally connected cable extending from the base of said body to said shaft and oppositely wound thereon from the lifting cables.

In testimony whereof I have signed my name to this specification in the presence of two subscribing witnesses.

NATHAN D. WALDEN.

Witnesses:
A. V. THOMAS,
THOMAS DUFFE.